United States Patent [19]

Bareis et al.

[11] Patent Number: 5,307,709
[45] Date of Patent: May 3, 1994

[54] ARRANGEMENT PROVIDED ON A PRESS FOR ADJUSTING THE STROKES OF A WORKING SLIDE AND OF A COUNTER-OSCILLATING WEIGHT

[75] Inventors: Alfred Bareis, Uhingen; Reinhard Braun, Eislingen, both of Fed. Rep. of Germany

[73] Assignee: L. Schuler GmbH, Fed. Rep. of Germany

[21] Appl. No.: 955,022

[22] Filed: Oct. 1, 1992

[30] Foreign Application Priority Data

Oct. 4, 1991 [DE] Fed. Rep. of Germany ....... 4132976

[51] Int. Cl.$^5$ .............................................. B30B 1/26
[52] U.S. Cl. ................................ 74/571 M; 100/257; 100/282
[58] Field of Search ................. 74/571 M, 568 R; 100/257, 282; 384/294, 430

[56] References Cited

U.S. PATENT DOCUMENTS

| | | | |
|---|---|---|---|
| 3,611,918 | 10/1971 | Marsh et al. | 100/282 X |
| 3,662,640 | 5/1972 | Wrona | 100/257 X |
| 4,748,883 | 6/1988 | Portmann | 74/571 M |
| 4,785,732 | 11/1988 | Czapka et al. | 100/257 |
| 4,890,476 | 1/1990 | Takahashi et al. | 100/282 X |

FOREIGN PATENT DOCUMENTS

| | | | |
|---|---|---|---|
| 2806976 | 8/1978 | Fed. Rep. of Germany | 100/282 |
| 1180275 | 9/1985 | U.S.S.R. | 100/257 |
| 1435052 | 5/1976 | United Kingdom | 100/282 |

Primary Examiner—Leslie A. Braun
Assistant Examiner—Ryan W. Massey
Attorney, Agent, or Firm—Evenson, McKeown, Edwards & Lenahan

[57] ABSTRACT

An arrangement on a press having an eccentric shaft for adjusting the strokes of a working slide and of a counter-oscillating weight by adjustable eccentric/eccentric bush pairings. The eccentric bushes of these pairings can be detached and fixed on the eccentrics in the rotating direction since the connection is in each case an interference fit with a cylindrical locating surface that can be released by the feeding of pressure oil. This permits a narrow construction of the press with a relatively short eccentric shaft. The eccentrics are arranged directly next to one another on an eccentric shaft, and the eccentric bushes are rotationally connected with one another via radial disks with radial slots and pins engaging in them. The adjusting of the strokes takes place by rotating the eccentric shaft when the interference fits are released and the eccentric bushes are locked.

11 Claims, 3 Drawing Sheets

ARRANGEMENT PROVIDED ON A PRESS FOR ADJUSTING THE STROKES OF A WORKING SLIDE AND OF A COUNTER-OSCILLATING WEIGHT

BACKGROUND AND SUMMARY OF THE INVENTION

The present invention relates to an arrangement on a press having a eccentric shaft for adjusting the stroke of a working slide and the stroke of a counter-oscillating weight used for the balancing of masses by adjusting the resulting eccentricities of two eccentric/eccentric bush pairings of identical eccentricities arranged at the same central angle. Working connecting rods which carry the working slide are arranged on these two eccentric-/eccentric bush pairings. Another eccentric/eccentric bush pairing is arranged between these two eccentric-/eccentric bush pairings, the eccentrics of this third eccentric/eccentric bush pairing being offset with respect to the eccentrics of the two other eccentric/eccentric bush pairings by a central angle of 180°. A mass balancing connecting rod which carries the counter-oscillating weight is arranged on the third eccentric/eccentric bush pairing. The eccentric bushes are selectively detachable and fixable in the rotating direction on the eccentrics because the bearing of the eccentric bushes on the interfering eccentrics is an interference fit with cylindrical locating surfaces established between these two parts. For the feeding of pressure oil via at least one groove, these two parts can be detached in at least one locating surface, in which case the eccentric bushes can be fixed on a part not rotating together with the eccentric shaft. In this fixed state, when the eccentric bushes are detached from the eccentrics, the eccentric shaft can be rotated for the purpose of adjusting the strokes.

In a known arrangement of this type (European Patent Document EP 0 248 917 A1), an angle generator disk is rotatably disposed directly next to each eccentric/eccentric bush pairing on a central portion of the eccentric shaft. This angle generator disk has a radial groove which is open toward the eccentric bush and in which a pin engages continuously which is in parallel to the eccentric shaft and is fastened in the adjacent eccentric bush. Each of these angle generator disks has a recess on its outer circumference into which a locking pin can be directed which is radially slidable with respect to the eccentric shaft and is otherwise arranged to be fixed to the frame. In addition, an initiator is provided on the outer circumference of each angle generator disk which can act upon an assigned sensor which is fixedly mounted on the frame. As a result, the angle position of each angle generator disk can be monitored and fixed. When the angle generator disks are locked, while the interference fits in the eccentric/eccentric bush pairings are released, their resulting eccentricities may be adjusted, specifically correspondingly for the working connecting rod as well as for the mass balancing connecting rod. It is an advantage of this known arrangement that additional bearings for the eccentric shaft may be arranged between the eccentric/eccentric bush pairings together with the angle generator disks. Also, that the resulting eccentricities for the working connecting rod, on the one hand, and the mass balancing connection rod, on the other hand, may be adjusted to be offset with respect to one another by precisely 180°. A disadvantage of this known arrangement, however, is the large number of components arranged next to one another on the eccentric shaft which, when additional bearings for the eccentric shaft are included, result in an undesirably large overall width of the press.

It is therefore an object of the invention to provide a development of the arrangement of the initially described type which is suitable for a narrow construction of the press with a relatively short eccentric shaft and in which case the additional bearings for the eccentric shaft are also not necessary.

This and other objects are achieved by the present invention which provides an arrangement on a press in which the three eccentrics are arranged directly next to one another on the eccentric shaft. The two eccentric bushes carrying the two working connecting rods are provided with radially extending disks which face the transverse center plane and which each have a radial groove or a radial slot that is open toward the transverse center plane. The eccentric bush carrying the mass balancing connecting rod carries a pin which projects on both sides, is parallel to the eccentric shaft, and the projecting ends of which constantly engage in the grooves or slots in the disks of the two other eccentric bushes via sliding blocks. At least one of the two radial disks has a bore close to the outer circumference into which a locking pin can be directed which is arranged on the working connecting rod and can be slid parallel to the eccentric shaft.

The separate angle generator disks as well as the locking pins and sensors for these are therefore no longer necessary. However, the arrangement of additional bearings for the eccentric shaft between the eccentric/eccentric bush pairings together with the angle generator disks is also no longer possible. The central eccentric bush, which carries the mass balancing connecting rod, is coupled with the two outer eccentric bushes carrying the working connecting rods via the disk provided on the eccentric bushes, by means of the pins, the grooves or slots and the sliding blocks. This arrangement has the result that, for geometric reasons, the resulting eccentricities of the central eccentric/eccentric bush pairing and of the outer eccentric/eccentric bush pairings are situated offset with respect to one another precisely by a central angle of 180° only in the two end positions (maximal and minimal resulting eccentricities). In the intermediate positions, there are slight deviations. However, this still results in a very good, although not complete, dynamic balancing of masses.

In certain embodiments of the invention, the eccentricities of the central eccentric/eccentric bush pairing are selected to be much larger, for example, twice as large as the eccentricities of the outer eccentric/eccentric bush pairings, whereby the counter-oscillating weight may be kept smaller.

Other objects, advantages and novel features of the present invention will become apparent from the following detailed description of the invention when considered in conjunction with the accompanying drawings.

DETAILED DESCRIPTION OF THE DRAWINGS

Figure 1:
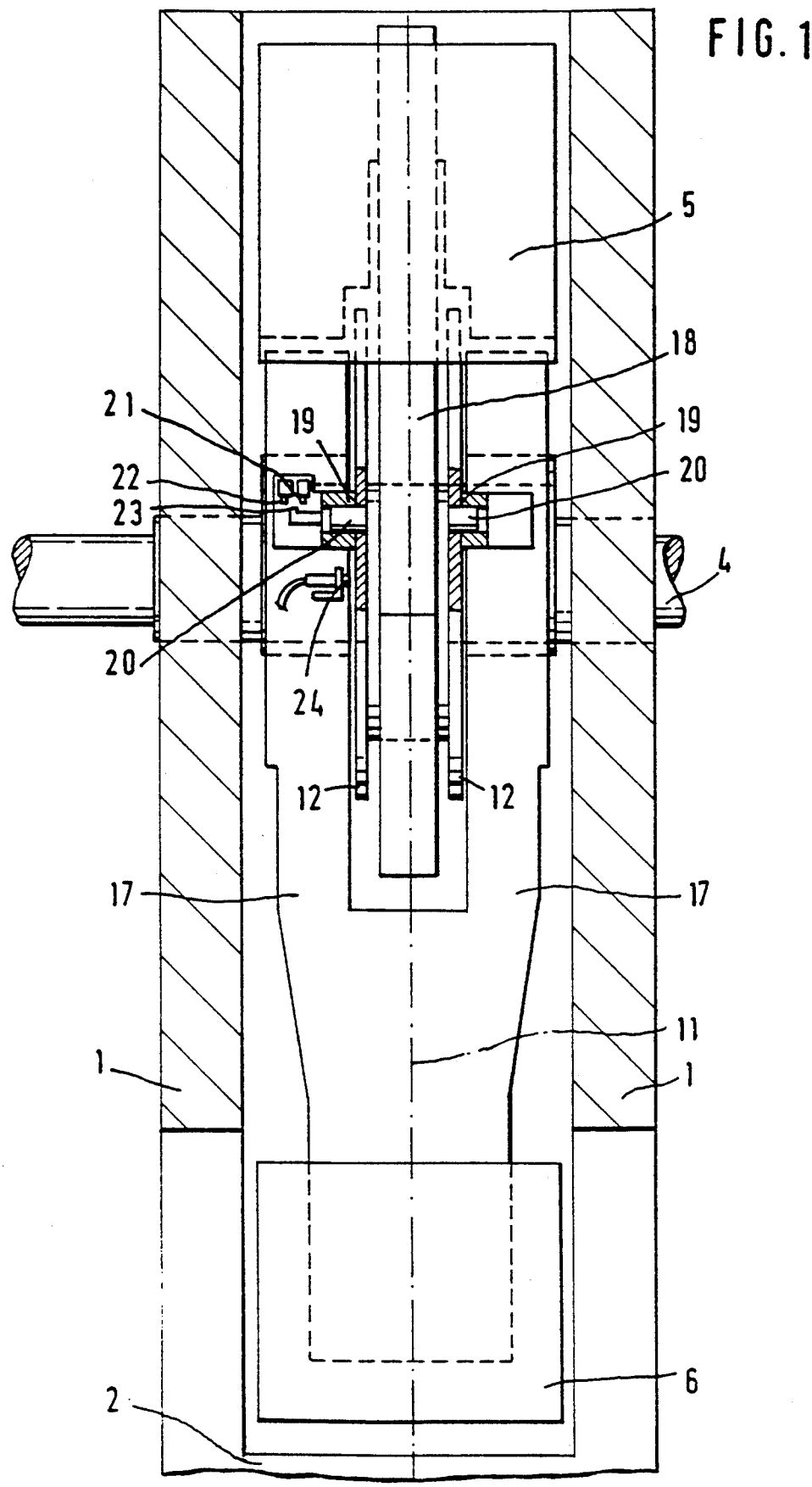
FIG. 1 is a frontal view, the front part of the frame being partially cut away, of a press with an arrangement constructed according to an embodiment of the invention for adjusting the strokes of a working slide and of a counter-oscillating mass.
Figure 2:
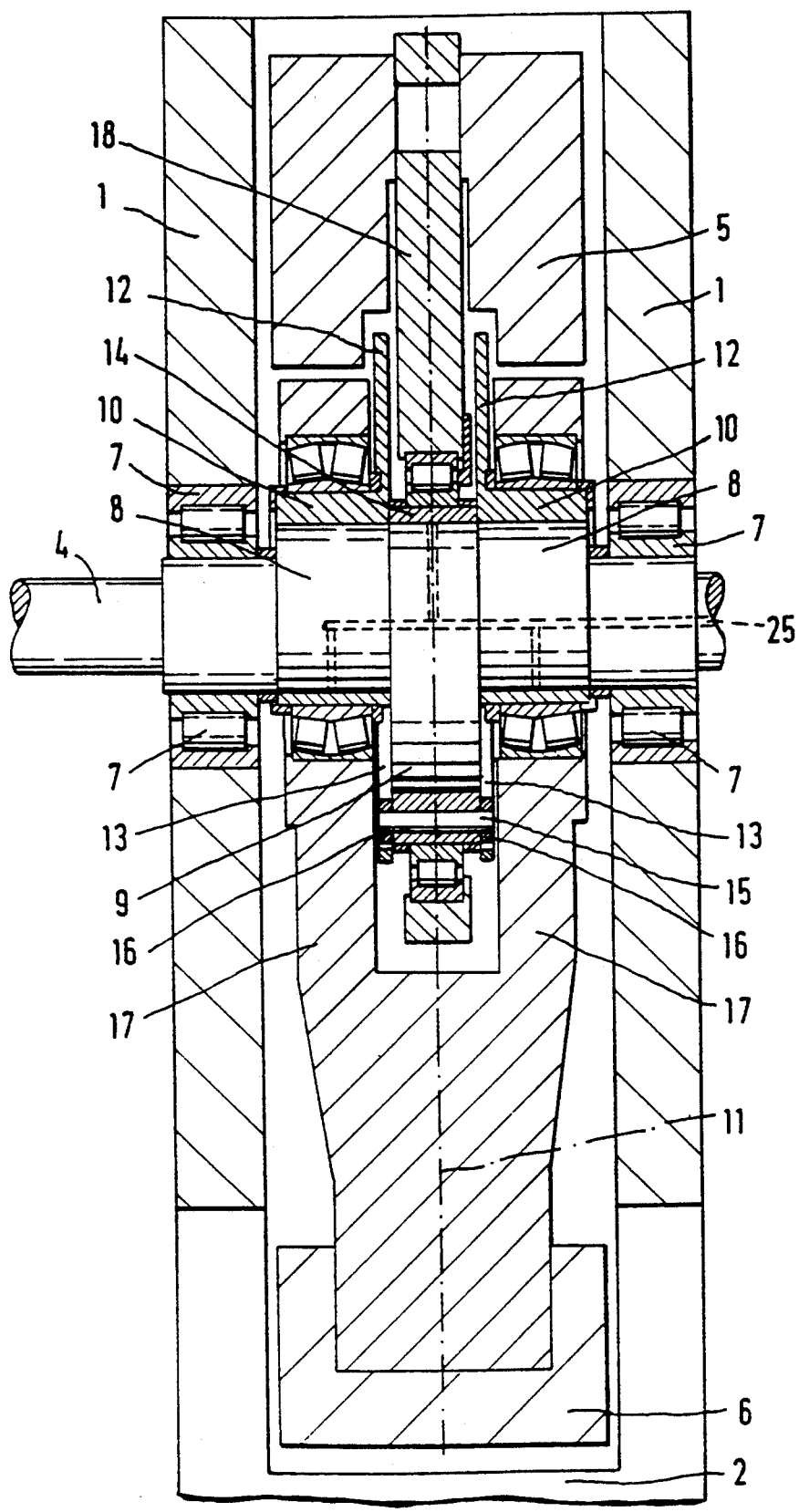
FIG. 2 is a perpendicular sectional view of the plane comprising the axis of the eccentric shaft.
Figure 3:
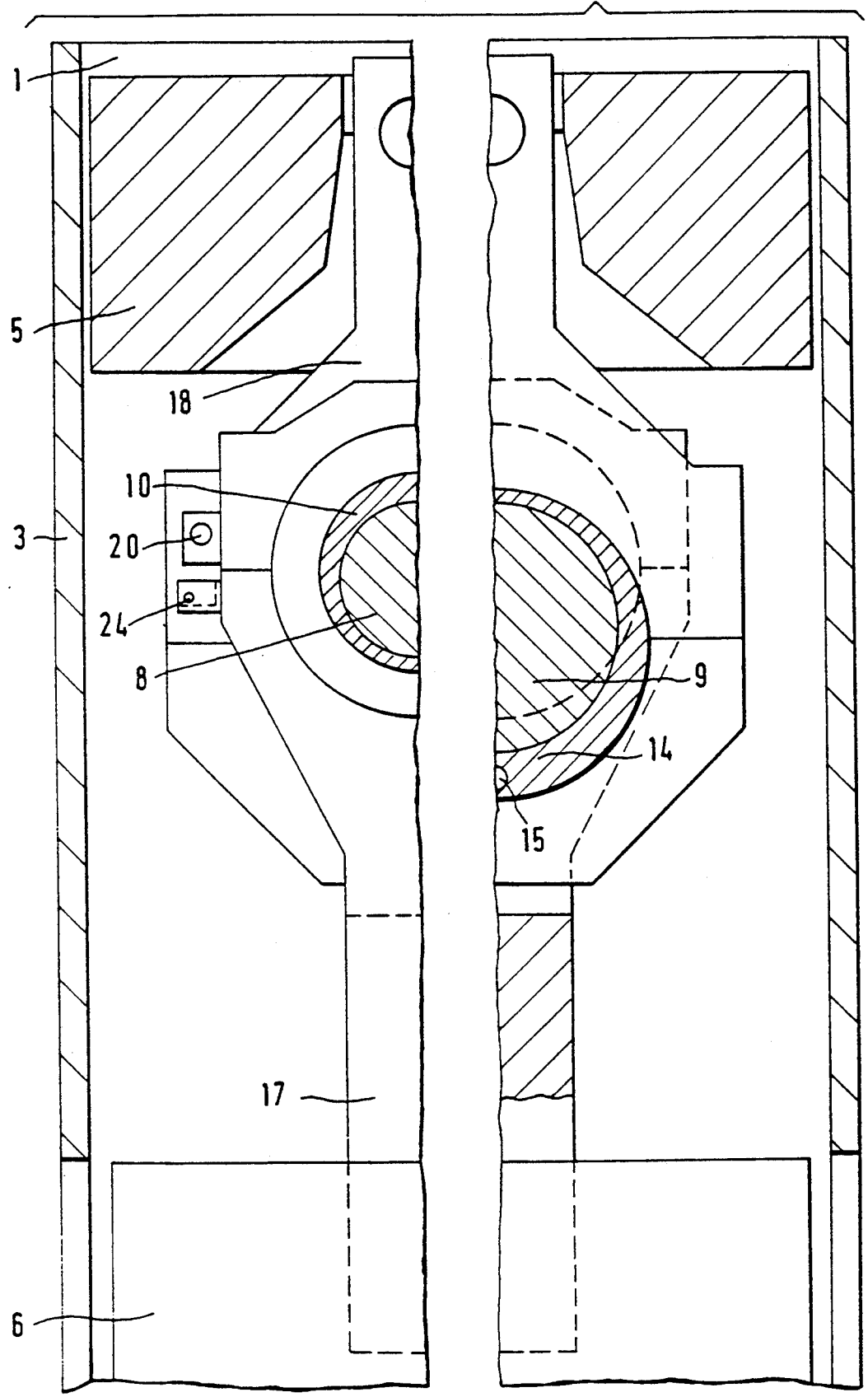
FIG. 3 is a partial perpendicular sectional view of the transverse center plane.

The press frame comprises two side stands 1, a press bed 2 and connecting plates 3 (FIG. 3) arranged on the front and on the rear side. In the side stands 1, an eccentric shaft 4 is disposed in bearings 7, the drive of the eccentric shaft not being shown. In the press frame, a counter-oscillating weight 5 is perpendicularly movably guided in the upper part, and a working slide 6 is perpendicularly movably guided in the lower part, the guides normally used for this purpose not being illustrated.

Between the bearings 7, in the areas adjacent to these bearings 7, the eccentric shaft 4 has two identically directed eccentrics 8 of a smaller eccentricity. In the center between these eccentrics 8 and directly following them, there is an eccentric 9 of a larger eccentricity which, with respect to the eccentrics 8, is offset by a central angle of 180°. On the eccentrics 8, eccentric bushes 10 are disposed which, on their sides facing the transverse center plane 11, are provided with radially extending disks 12 which each have a radial slot, the two slots 13 pointing in the same direction.

On the eccentric 9, another eccentric bush 14 is disposed which carries a pin 15 which is parallel to the eccentric shaft 4. The pin 15 projects on both sides of the bush 14 and has projecting ends, which via sliding blocks 16, continuously engage into the slots 13 in the disks 12. On the two eccentric bushes 10, two working connecting rods 17 are disposed which, on the other end, are combined in a fork-shaped manner and are disposed in the working slide 6. In addition, a mass balancing connecting rod 18 is arranged at one end on the central eccentric bush 14 and, on the other end, is arranged in the counter-oscillating weight 5. The interference fits between the eccentric bushes 10,14 and the eccentrics 8,9 are established when a temperature difference exists between the bushes and the eccentrics. Such a fitting is a well-known method of fitting.

Close to their outer circumference, the two radial disks 12 have bores 19 into which locking pins 20 can be directed that can be slid in parallel to the eccentric shaft 4 and are provided on the working connecting rods 17. With these locking pins 20, the eccentric bushes 10 can be locked directly and the eccentric bush 14 can be locked indirectly. The respective engaged and disengaged position of a locking pin 20 can be monitored by sensors 21, 22 mounted on one working connecting rod 17 which can be acted upon by a nose 23 on a rearward extension of the locking pin 20. Another sensor 24 is provided on one of the working connecting rods 17 by means of which the reaching of that position of the disks 12 can be monitored in which the locking pins 20 can be directed inside.

After the eccentric bushes 10, 14 are locked by the locking pins 20 and the interference fits in the eccentric-/eccentric bush pairings 8/10, 9/14 are released by being acted upon by pressure via a central bore 25 in the eccentric shaft 4, the resulting eccentricities of the eccentric/eccentric bush pairings 8/10 and 9/14 can be correspondingly adjusted at the same time. This is done by rotating the eccentric shaft 4 into a corresponding angular position, for example, by means of a (not shown) creep speed drive. The operational readiness of the press with the newly adjusted strokes of the working slide 6 and of the counter-oscillating weight 5 can then be restored by the withdrawal of the locking pins 20 and the reestablishment of the interference fits by relieving the pressure of the central bore 25.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement on a press comprising:
   a working slide;
   a counter-oscillating weight for balancing masses;
   first and second eccentric/eccentric bush pairings of identical eccentricities arranged at a same central angle, on which working connecting rods are arranged which carry the working slide, and a third eccentric/eccentric bush pairing arranged between the first and second eccentric/eccentric bush pairings, the eccentrics of the third eccentric/eccentric bush pairing being offset with respect to the eccentrics of the first and second eccentric/eccentric bush pairings by a central angle of 180°, each eccentric/eccentric bush pairing having an eccentric and an eccentric bush, with each eccentric bush of the first and second eccentric/eccentric bush pairings being provided with a radially extending disk which faces a transverse center plane and which has a radial slot that is open toward the transverse center plane;
   an eccentric shaft for adjusting a stroke of the working slide and a stroke of the counter-oscillating weight by adjusting the resulting eccentricities of the first, second and third eccentric/eccentric bush pairings, wherein the three eccentrics of the first, second and third eccentric/eccentric bush pairings are arranged directly next to one another on the eccentric shaft;
   a mass balancing connecting rod which carries the counter-oscillating weight and is carried on the third eccentric/eccentric bush pairing;
   wherein the bearing of the eccentric bushes on their respective eccentrics is an interference fit with cylindrical locating surfaces established therebetween, and which, for the feeding of pressure oil via at least one groove, can be detached in at least one locating surface, whereby the eccentric bushes are selectively detachable and fixable in the rotating direction on the eccentrics, the eccentric bushes being fixable on a part not rotating together with the eccentric shaft, and in this fixed state, when the eccentric bushes are detached from the eccentrics, the eccentric shaft is rotatable for adjusting the strokes;
   wherein the eccentric bush of the third eccentric/eccentric bush pairing carries a pin which projects on both sides of the eccentric bush, is parallel to the eccentric shaft, and has projecting ends which constantly engage in the slots in the disks of the first and second eccentric bushes via sliding blocks; and
   wherein at least one of the radial disks has a bore proximate to the outer circumference adapted to receive a locking pin arranged on the working connecting rod and which is controllably slidable parallel to the eccentric shaft between locking and unlocking positions to thereby lock and unlock the eccentric bushes from rotation.

2. An arrangement according to claim 1, wherein the interference fits between the eccentric bushes and the eccentrics are established when a temperature difference exists between these two parts.

3. An arrangement according to claim 2, further comprising an axial pressure oil line in the eccentric shaft with at least one connecting line to each groove.

4. An arrangement according to claim 2, wherein the ratio of the eccentricities of the eccentric bushes to the eccentricities of the eccentrics is the same for all of the eccentric/eccentric bush pairings.

5. An arrangement according to claim 1, wherein the interference fits between the eccentric bushes and the eccentrics are established when a pressure medium acts upon hollow spaces bounded by the cylindrical locating surfaces in the eccentric bushes.

6. An arrangement according to claim 5, further comprising an axial pressure oil line in the eccentric shaft with at least one connecting line to each groove.

7. An arrangement according to claim 6, wherein the ratio of the eccentricities of the eccentric bushes to the eccentricities of the eccentrics is the same for all of the eccentric/eccentric bush pairings.

8. An arrangement according to claim 7, wherein the eccentricities of the eccentrics and the eccentricities of the eccentric bushes are the same for all of the eccentric/eccentric bush pairings.

9. An arrangement according to claim 5, wherein the ratio of the eccentricities of the eccentric bushes to the eccentricities of the eccentrics is the same for all of the eccentric/eccentric bush pairings.

10. An arrangement according to claim 1, further comprising an axial pressure oil line in the eccentric shaft with at least one connecting line to each groove.

11. An arrangement according to claim 1, wherein the ratio of the eccentricities of the eccentric bushes to the eccentricities of the eccentrics is the same for all of the eccentric/eccentric bush pairings.

* * * * *